United States Patent
Reiling et al.

(10) Patent No.: US 12,420,582 B2
(45) Date of Patent: Sep. 23, 2025

(54) METHOD FOR PRODUCING A MOTOR VEHICLE RIM MADE OF ALUMINIUM OR AN ALUMINIUM ALLOY FOR A WHEEL OF A MOTOR VEHICLE AND CORRESPONDING MOTOR VEHICLE RIM

(71) Applicants: AUDI AG, Ingolstadt (DE); Superior Industries Automotive Germany GmbH, Lüdenscheid (DE)

(72) Inventors: Jaan Mattes Reiling, Sassenberg (DE); Jan Gaugler, Neckarmühlbach (DE); Marc Hummel, Güglingen (DE); Detlef Kube, Sundern (DE); Michael Timm, Plettenberg (DE)

(73) Assignees: AUDI AG, Ingolstadt (DE); SUPERIOR INDUSTRIES AUTOMOTIVE GERMANY GMBH, Lüdenscheid (DE)

( * ) Notice: Subject to any disclaimer, the term of this patent is extended or adjusted under 35 U.S.C. 154(b) by 279 days.

(21) Appl. No.: 17/788,126

(22) PCT Filed: Jan. 8, 2021

(86) PCT No.: PCT/EP2021/050219
§ 371 (c)(1),
(2) Date: Jun. 22, 2022

(87) PCT Pub. No.: WO2021/144197
PCT Pub. Date: Jul. 22, 2021

(65) Prior Publication Data
US 2023/0042862 A1    Feb. 9, 2023

(30) Foreign Application Priority Data
Jan. 14, 2020 (DE) .......................... 102020100701.9

(51) Int. Cl.
*B60B 3/06* (2006.01)
*B22D 17/14* (2006.01)
(Continued)

(52) U.S. Cl.
CPC ................. *B60B 3/06* (2013.01); *B22D 17/14* (2013.01); *B22D 25/02* (2013.01); *B60B 3/02* (2013.01);
(Continued)

(58) Field of Classification Search
CPC ............ B22D 17/14; B22D 25/02; B60B 3/06
(Continued)

(56) References Cited

U.S. PATENT DOCUMENTS

| 3,856,360 A | 12/1974 | Lindberg et al. | |
| 2016/0045955 A1* | 2/2016 | Sasaki et al. | B22D 18/06 164/254 |
| 2019/0283107 A1* | 9/2019 | Chang et al. | B21D 53/30 |

FOREIGN PATENT DOCUMENTS

| DE | 4138558 A1 | 5/1993 |
| DE | 9421365 U1 | 11/1995 |

(Continued)

OTHER PUBLICATIONS

Machine translation of DE 10 2005 026 829 A1 (Year: 2006).*
(Continued)

*Primary Examiner* — Kevin P Kerns
(74) *Attorney, Agent, or Firm* — Maier & Maier, PLLC

(57) ABSTRACT

A method for producing a motor vehicle rim made of aluminum or an aluminum alloy for a motor vehicle wheel. The motor vehicle rim has a rim base delimited on opposite sides by an outer horn and an inner horn, a hub with a central recess and a hole circle and a rim center connecting the rim base and the hub to one another and acting eccentrically on the rim base in longitudinal section. The motor vehicle rim is produced in one piece and continuously in a casting mold by vacuum die casting of a casting material, wherein the motor vehicle rim has a small wall thickness of at most 15 mm at least in some regions and/or a curvature with a small radius of curvature of at most 4 mm.

20 Claims, 2 Drawing Sheets

(51) Int. Cl.
*B22D 25/02* (2006.01)
*B60B 3/02* (2006.01)
*B60B 3/10* (2006.01)
*C22C 21/02* (2006.01)

(52) U.S. Cl.
CPC ............... *B60B 3/10* (2013.01); *C22C 21/02* (2013.01); *B60B 2310/202* (2013.01); *B60B 2310/54* (2013.01); *B60B 2360/104* (2013.01); *B60B 2900/112* (2013.01); *B60B 2900/113* (2013.01)

(58) Field of Classification Search
USPC .................................................. 164/113, 61
See application file for complete search history.

(56) References Cited

FOREIGN PATENT DOCUMENTS

| DE | 69601183 T2 | 7/1999 | | |
|---|---|---|---|---|
| DE | 102005026829 A1 | 12/2006 | | |
| DE | 102016106256 B3 | 3/2017 | | |
| DE | 102018220305 A1 | 5/2020 | | |
| EP | 158568 A | * 10/1985 | ............. | B21D 22/16 |
| EP | 0301472 B1 | 4/1991 | | |
| EP | 0687742 B1 | 9/1997 | | |
| EP | 0301472 B2 | 1/1998 | | |
| EP | 1034863 A1 | 9/2000 | | |
| EP | 1261445 B1 | 11/2003 | | |
| EP | 2425030 B1 | 11/2013 | | |
| EP | 2848333 A1 | 3/2015 | | |
| GB | 2249063 A | * 4/1992 | ............. | B60B 3/06 |
| WO | 8505328 A1 | 12/1985 | | |

OTHER PUBLICATIONS

Office Action issued on Oct. 18, 2023, in corresponding German Application No. 102020100701.9, 11 pages.
German Examination Report issued on Sep. 24, 2020, in connection with corresponding German Application No. 102020100701.9 (20 pp., including machine-generated English translation).
International Preliminary Report on Patentability with English translation issued on Jul. 19, 2022, in corresponding International Application No. PCT/EP2021/050219; 13 pages.
International Search Report with English translation issued on Apr. 26, 2021, in corresponding International Application No. PCT/EP2021/050219; 6 pages.

* cited by examiner

METHOD FOR PRODUCING A MOTOR VEHICLE RIM MADE OF ALUMINIUM OR AN ALUMINIUM ALLOY FOR A WHEEL OF A MOTOR VEHICLE AND CORRESPONDING MOTOR VEHICLE RIM

FIELD

The invention relates to a method for producing a motor vehicle rim made of aluminum or an aluminum alloy for a wheel of a motor vehicle, wherein the motor rim has a rim base delimited on opposite sides by an outer horn and an inner horn, a hub with a central recess and a hole circle, and a rim center connecting the rim base and the hub to one another and acting eccentrically on the rim base in longitudinal section. The invention also relates to a motor vehicle rim.

BACKGROUND

The publication EP 0 301 472 B1, for example, is known from the prior art. This document describes a manufacturing process for cast light metal wheels for passenger cars, using a near-eutectic, refined AlSi alloy that—in addition to Al—has a weight proportion of 9.5% to 12.5% silicon and alloy components such as a maximum of 0.2% iron, a maximum of 0.05% manganese, a maximum of 0.1% titanium, a maximum of 0.03% copper, a maximum of 0.05% zinc and an individual maximum for each other impurity of 0.05% and of 0.15% in total of other impurities, and wherein, after solidification, the wheels are removed from the mold and cooled. It is provided that the alloy contains at least 0.05 to a maximum of 0.15% by weight of magnesium and that the wheels are quenched in water, from a temperature—measured on their surface—of at least 380° C. in inner regions or regions with mass concentrations, such as hubs and wheel discs, immediately upon removal from the mold.

Furthermore, DE 696 01 183 T2 shows an aluminum die-cast alloy for a wheel disc, comprising Si: 0.6 to 1.0% by weight, Mg: 0.8 to 1.2% by weight, Cu: 0.1 to 0.5% by weight, Zn: 0.4 to 1.2% by weight, Mn: 0.4 to 1.2% by weight, Ti: 0.01 to 0.20% by weight, B: 0.002 to 0.04% by weight and the remainder Al and unavoidable impurities.

SUMMARY

It is an object of the invention to propose a method for producing a motor vehicle rim from an aluminum alloy for a wheel of a motor vehicle, which has advantages over known methods of this type, in particular a particularly fast and cost-effective production of the motor vehicle rim with particularly delicate structures.

This is achieved by a method for manufacturing a motor vehicle rim. It is provided that the motor vehicle rim is produced in one piece and continuously in a casting mold by vacuum die casting of a casting material, wherein the motor vehicle rim has a small wall thickness of at most 15 mm at least in some regions and/or a curvature with a small radius of curvature of at most 4 mm, and/or a demolding surface running in the axial direction and in the radial direction and/or in the axial direction and in the tangential direction with respect to the longitudinal central axis of the motor vehicle rim, which surface completely lies in an imaginary plane, wherein the plane encloses an angle of at least 0° and at most 4° with the longitudinal central axis.

The motor vehicle rim is usually part of the wheel of the motor vehicle, with several wheels being arranged on the motor vehicle, each of which has such a motor vehicle rim. The motor vehicle is in the form of a motor car and has more than two wheels, in particular exactly four wheels. The motor vehicle rim is explicitly provided and designed for use in such a motor vehicle designed as a motor car. The motor vehicle rim is therefore not available as a generic motor vehicle rim, but is intended for use on the motor vehicle and is designed accordingly.

The main components of the motor vehicle rim are the rim base, the rim center and the hub. The rim base and the hub are connected to one another via the rim center, wherein at least the rim base, the rim center and the hub are formed in one piece and of the same material. The rim base, the rim center and the hub are formed simultaneously with one another, namely during a single assembly step. So it is not intended to manufacture the rim base, the rim center and the hub separately from one another and subsequently attach them to one another. Rather, the production takes place simultaneously, namely by die casting of the casting material in the mold.

The motor vehicle rim has a longitudinal central axis which, in particular, corresponds to a longitudinal central axis of the hub and preferably coincides or at least almost coincides with a subsequent axis of rotation of the wheel. Seen in the axial direction with respect to this longitudinal central axis, the rim base is delimited on opposite sides by the outer horn and the inner horn. The outer horn and the inner horn are on opposite sides of the rim base and enclose a tire receiving region of the motor vehicle rim between them as seen in a longitudinal section with respect to the longitudinal central axis. The tire receiving region is used to accommodate a tire, which, together with the motor vehicle rim, forms the wheel. Tire receiving region is delimited radially inward by the rim base and axially on opposite sides by the outer horn and the inner horn.

Particularly preferably, the entire motor vehicle rim is delimited in the axial direction or in longitudinal section in a first direction by the outer horn and in a second direction by the inner horn, so that the outer horn and the inner horn define a total extension of the motor vehicle rim in the axial direction, corresponding to a width the motor vehicle rim. When the wheel is mounted on the motor vehicle, the wheel is rotatably mounted on a wheel support via a wheel bearing. After the wheel has been mounted on the motor vehicle, the outer horn is on a side of the motor vehicle rim facing away from the wheel support and the inner horn is on a side of the motor vehicle rim facing the wheel support.

The outer horn and the inner horn are in the form of a radial projection starting from the rim base and extending radially outwards from the rim base, again in relation to the longitudinal central axis of the motor vehicle rim. Of course, the outer horn and the inner horn are also formed in one piece and of the same material with the rest of the motor vehicle rim, in particular the rim base, the rim center and the hub. They are insofar formed simultaneously therewith during vacuum die casting.

The hub has the central recess and the hole circle. The central recess is a centered recess for receiving a wheel hub of the motor vehicle, to which the wheel is attached during mounting on the motor vehicle. The wheel hub is rotatably mounted on the wheel support via the wheel bearing. The hole circle consists of several holes arranged along an imaginary circle, each of which is used to hold a fastener, which is used to fasten the motor vehicle rim to the wheel hub. The fastening means is, for example, in the form of a screw, a bolt or the like.

The rim base and the hub are connected to each other via the rim center. The rim center is therefore located between the rim base and the hub in the radial direction with respect to the longitudinal central axis. Seen in the radial direction, it extends from the hub to the rim base. For example, the rim center has a plurality of spokes which are arranged or formed at a distance from one another in the circumferential direction. However, the rim center can also be designed continuously in the circumferential direction, in particular completely.

The rim center engages in the axial direction or viewed in longitudinal section, for example, eccentrically on the rim base. This means that it merges into the rim base in the axial direction away from a center point of the latter. The rim center preferably acts at a distance from the center point of the rim base in the axial direction, which is at least 10%, at least 20%, at least 30%, at least 40% or more in relation to the total extent of the rim base in the axial direction. For example, viewed in the axial direction, the rim center merges with the rim base at the end thereof. In this case, the rim center, viewed in longitudinal section, opens into the rim base overlapping the outer horn or the inner horn, preferably the former. Due to the rim center acting eccentrically on the rim base, not only a force acts on the rim center after the wheel has been mounted on the motor vehicle in the radial direction, but also a bending moment in the axial direction or in an imaginary plane containing the longitudinal central axis of the motor vehicle rim. Because of this, it was previously necessary to make the rim center correspondingly massive using a lot of material.

Viewed in longitudinal section, the rim base preferably has a greater extent in the axial direction than the rim center and the hub. In particular, the axial extent of the rim base is greater than the axial extent of the hub, which in turn is greater than the axial extent of the rim center. For example, the axial extension of the hub based on the axial extent of the rim base is 50%, 40%, 30%, 25% or 20% at most. The axial extent of the rim center is, for example, at most 25%, at most 20%, at most 15%, at most 10% or at most 5%, based on the axial extent of the rim base. The dimensions mentioned create a receptacle for the wheel hub and/or a brake disc fastened to the wheel, surrounded by the rim base, with the wheel hub and/or the brake disc being present in this receptacle after the wheel has been mounted on the motor vehicle.

The motor vehicle rim consists continuously and of the same material as the casting material, namely aluminum or—preferably—aluminum alloy. This is processed by vacuum die casting. In vacuum die casting, the casting mold is used, by means of which the motor vehicle rim and thus at least the rim base together with the outer horn and the inner horn, the rim center and the hub are formed. The central recess, which incidentally can also be referred to as the wheel hub mount, is also preferably at least partially formed during vacuum die casting.

Vacuum die casting is characterized in that the casting mold is at least partially evacuated before and/or during the introduction of the casting material into the casting mold. This means that the casting mold is subjected to a negative pressure before and/or during the introduction of the casting material. The negative pressure is to be understood here as meaning a pressure which is lower than an introduction pressure at which the casting material is introduced into the casting mold and/or an ambient pressure in an external environment of the casting mold. For example, the negative pressure based on the external pressure is at most 50%, at most 25%, at most 10% or at most 5%. For example, the residual pressure is between 50 mbar and 200 mbar. The residual pressure is the absolute pressure in the casting mold.

The casting mold is evacuated, for example, by means of a vacuum source, which is flow-connected to the casting mold for this purpose. In particular, the casting mold is evacuated before the casting material is introduced. For example, the casting material is introduced when, in particular only when, a certain negative pressure or residual pressure is reached in the casting mold. It can additionally or alternatively be provided to evacuate the casting mold during the introduction of the casting material, i.e. to maintain the flow connection between the vacuum source and the casting mold during the introduction of the casting material into the casting mold and to continue to operate the vacuum source for evacuating the casting mold. As a result, the motor vehicle rims can be produced with particularly delicate structures.

For example, provision is made for the casting mold to first be sealed by means of at least one seal, for example by means of a sealing cord, in particular a silicone sealing cord. The casting material is then metered into a casting chamber that is fluidically connected to the casting mold. For this purpose, the casting chamber is fluidically connected at least at times to a crucible in which the molten casting material is stored. Then the casting mold is subjected to the negative pressure and the casting material in the casting chamber is forced into the casting mold, in particular by means of a pressurized piston. The flow connection between the casting chamber and the crucible preferably is present at the same time, in particular continues to exist. This means that the casting chamber is also evacuated while the casting material is being introduced.

The motor vehicle rim produced by vacuum die casting is characterized by a particularly small wall thickness and/or a curvature with a particularly small radius of curvature and/or by the presence of the demolding surface. The wall thickness is to be understood as meaning the thickness of the wall of the motor vehicle rim at at least one point. The small wall thickness can therefore be present, for example, on the rim base, the outer horn, the inner horn, the rim center and/or the hub. The low wall thickness at the rim center is particularly preferred. The small wall thickness is very particularly preferably the greatest wall thickness, for example the greatest wall thickness of the outer horn, the greatest wall thickness of the inner horn and/or the greatest wall thickness of the rim center. Of course, it can also be the greatest wall thickness of the rim base and/or the hub.

The small wall thickness is at most 15 mm, at most 10 mm, at most 7.5 mm or at most 5 mm, but is preferably smaller. Thus it is, for example, at most 4 mm, at most 3 mm, at most 2 mm or at most 1.5 mm. Conversely, the small wall thickness is particularly preferably at least 1.5 mm or at least 2 mm. In other words, the small wall thickness is, for example, at least 1.5 mm and at most 5 mm, at least 1.5 mm and at most 4 mm, at least 1.5 mm and at most 3 mm, at least 1.5 mm and at most 2 mm or about or exactly 1.5 mm. However, it can also be at least 2 mm and at most 5 mm, at least 2 mm and at most 4 mm, at least 2 mm and at most 3 mm or exactly 2 mm.

In addition or as an alternative to the small wall thickness, there is the curvature with the small radius of curvature. The curvature is a curvature of an outer surface or an outer peripheral surface of the motor vehicle rim. The outer surface delimits a wall of the motor vehicle rim to the outside. The curvature can be present at any point on the motor vehicle rim, for example on the rim base, the outer horn, the inner horn, the rim center and/or the hub. The curvature is in particular a transitional curvature between two surfaces which—seen in section—are angled to one another and are present, for example, as flat surfaces.

The curvature preferably extends over an angle of at least 30°, at least 45°, at least 60° or at least 90°. The curvature has the small radius of curvature, which is at most 4 mm, but is preferably smaller. For example, the small radius of curvature corresponds to a radius of curvature of at most 3 mm, at most 2 mm, at most 1.5 mm or at most 1 mm. Radiuses of curvature of at most 2 mm or less are preferred. Conversely, the radius of curvature can additionally be at least 0.25 mm, at least 0.5 mm or at least 0.75 mm.

In addition or as an alternative to the small wall thickness and/or the curvature with the small radius of curvature, the motor vehicle rim can have a demolding surface. The demolding surface is a flat surface that lies directly against the mold during vacuum die-casting and along which, after vacuum die-casting, the demolding of the motor vehicle rim from the mold takes place. The demolding surface has an extension at least in the axial direction and in the radial direction and/or—additionally or alternatively—in the axial direction and in the tangential direction, in each case with respect to the longitudinal central axis of the motor vehicle rim. In any case, the demolding surface therefore extends in two mutually perpendicular directions and in this respect lies completely in the imaginary plane.

The motor vehicle rim is demolded in the same direction. For example, part of the mold is displaced after the vacuum die-casting in the direction of the longitudinal central axis, i.e. in the axial direction, to open the mold and to remove the motor vehicle rim from the mold. This means that a casting mold surface of the casting mold that rests against and forms the demolding surface during vacuum die casting is displaced along the longitudinal central axis after die casting. In a conventional method for manufacturing a motor vehicle rim, a demolding angle, i.e. an angle between the demolding surface and the longitudinal central axis, must be at least 5° in order to ensure proper demolding.

Due to the one-piece and continuous formation of the motor vehicle rim by vacuum die-casting aluminum or the aluminum alloy, however, a significantly smaller angle can be realized. The angle between the demolding surface or between the plane completely accommodating the demolding surface and the longitudinal central axis is between infinitesimally more than 0° and 4°, each including these values. Provision can therefore be made for the demolding surface to run almost parallel to the longitudinal central axis, so that the casting mold surface and the demolding surface are displaced almost parallel during demolding. The angle of 0° means that the plane and the longitudinal central axis are coincident or run parallel to one another. The angle is, for example, at least 0.5°, at least 1° or at least 1.5°. However, a maximum angle of 4° is provided. For example, the angle is at most 3°, at most 2.0°, at most 1.5°, at most 1.0° or at most 0.5°. The smaller angles of at most 2.0° and less are preferred in this case.

The procedure described in the production of the motor vehicle rim allows for a simple, quick and inexpensive design of the motor vehicle rim, which at the same time has an extremely delicate structure. The rapid production is achieved in particular by vacuum die casting, in which the mold is filled much more quickly than in the case of permanent mold casting or low-die casting, which is normally used to manufacture motor vehicle rims. All in all, the cycle time in the production of the motor vehicle rim can be significantly increased by vacuum die casting, so that a larger number of motor vehicle rims can be produced in the same period of time. The solidification time is also significantly shorter for die casting than for permanent mold casting.

A development of the invention provides that the rim center is formed with a plurality of spokes spaced apart from one another in the circumferential direction with respect to the longitudinal central axis of the motor vehicle rim. Such a design of the rim center is used in particular to reduce the weight of the motor vehicle rim, but also to achieve better damping. In this respect, the rim center is not solid and designed to be continuous in the circumferential direction, but is composed of several spokes that are spaced apart from one another in the circumferential direction. Each of the multiple spokes preferably extends from the hub in the radial direction to the rim base, i.e. it connects the hub and the rim base to one another. For example, at least three spokes, at least four spokes, at least five spokes or at least six spokes are provided. For example, at least 10, at least 14 or at least 18 spokes are implemented. Preferably there are at most 30 spokes or at most 20 spokes. For example, each of the spokes extends in the circumferential direction over at most 30° or less, preferably at most 15° or at most 10°.

Provision can be made for the spokes to have a constant extent in the circumferential direction, that is to say starting from the rim base up to the hub. However, it is also possible for at least one of the spokes or several or each of the spokes to branch out, so that the respective spoke is divided into a number of partial spokes. For example, the spoke initially extends outwards in the radial direction, starting from the hub, and is divided at a division point into a plurality of partial spokes, which extend from one another, in particular in the circumferential direction. After the dividing point, the partial spokes thus run at a distance from one another up to the rim base and engage this at a distance from one another. Provision can be made for a central longitudinal axis of at least one of the spokes, in particular the central longitudinal axes of several or all of the spokes, to intersect the central longitudinal axis of the motor vehicle rim or even be perpendicular to it. This achieves a particularly optimal introduction of force from the rim center or from the spokes into the hub.

A development of the invention provides that the motor vehicle rim is produced in regions with a first wall thickness of more than 15 mm, in particular at least 17.5 mm or at least 20 mm, and in regions with a second wall thickness corresponding to the small wall thickness. For example, it is provided that the motor vehicle rim is produced in regions with a first wall thickness of more than 5 mm, in particular at least 7.5 mm or at least 10 mm, but at most 20 mm, and in regions with a second wall thickness corresponding to the small wall thickness. The second wall thickness is at least 1.5 mm or at least 2 mm and at most 15 mm, at most 10 mm, at most 7.5 mm or at most 5 mm, preferably at most 3 mm, at most 2.5 mm or at most 2 mm. The motor vehicle rim therefore does not have the small wall thickness all the way through, but is composed of several parts, some of which have the first wall thickness and others the second wall thickness. In this case, the first wall thickness is generally greater than the second wall thickness, for example by a factor of at least 1.5, at least 2.0 or at least 2.5. For example, the first wall thickness and the second wall thickness are both implemented in the middle of the rim. In particular, each of the spokes—if present—can have a part with the first wall thickness and a part with the second wall thickness. This ensures a particularly high load-bearing capacity of the motor vehicle rim with an extremely delicate design.

A further development of the invention provides that the small wall thickness is used in a region lying in the circumferential direction between two spokes, so that the two spokes are connected to each other by an intermediate spoke element, produced by vacuum die casting, which has the small wall thickness, at least partially, in particular continuously. The region lying between the two spokes in the circumferential direction can also be referred to as the intermediate spoke region. The region between the spokes extends in the circumferential direction between the two spokes and is delimited in the radial direction inwards by the hub and in the radial direction outwards by the rim base. In this respect, the intermediate spoke region lies at the edge of the motor vehicle rim.

The intermediate spoke region is now at least partially or even completely provided with the intermediate spoke element, so that the region between the two spokes is at least partially or even completely closed by the intermediate spoke element. The intermediate spoke element has the small wall thickness. The two spokes, on the other hand, can have a wall thickness, which is greater than the small wall thickness, for example a wall thickness corresponding to the first wall thickness. Of course, however, it can also be provided that the two spokes are designed with the small wall thickness. In this case, the small wall thickness or an even smaller wall thickness is also used for the intermediate spoke element, in particular throughout. With the aid of the intermediate spoke element, excellent aerodynamic properties are achieved for the motor vehicle rim.

A development of the invention provides that the intermediate spoke element is designed to completely fill a region which is delimited in the circumferential direction by the two spokes, in the radial direction inwards by the hub and in the radial direction outwards by the rim base. Such a configuration has already been pointed out above. The intermediate spoke element thus completely fills out the intermediate spoke region or completely closes it. As a result, particularly good aerodynamic properties are realized.

A development of the invention provides that the intermediate spoke element is produced with a load-bearing capacity in the radial direction that corresponds to at least 50%, at least 60%, at least 70% or at least 75% of the load-bearing capacity of one of the spokes. The load-bearing capacity is the load-bearing capacity in the radial direction between the hub and the rim base. In this respect, the intermediate spoke element extends in the radial direction, starting from the hub up to the rim base. The load-bearing capacity of the intermediate spoke element should be smaller than the load-bearing capacity of one of the spokes, in particular of each of the two spokes. However, the load-bearing capacity corresponds at least to one of the values mentioned.

A further development of the invention provides that the intermediate spoke element is produced with a load-bearing capacity in the radial direction which is at most 50%, at most 40%, at most 30% or at most 25% of the load-bearing capacity of one of the spokes. This was also mentioned above. Reference is made to the corresponding statements.

A further development of the invention provides that the rim base is produced during vacuum die casting with the small wall thickness and/or with the demolding surface on its radially inner side. Due to the particularly good material properties that can be achieved by means of vacuum die casting, the rim base can have the small wall thickness, specifically at least partially, namely either partially or continuously. Additionally or alternatively, the demolding surface is formed on the rim base, namely on the radially inner side of the rim base. On this side, the rim center engages the rim base or the spokes merge into the rim base. The demolding surface is therefore adjacent to one of the spokes, for example in the circumferential direction and/or in the axial direction, in particular in the circumferential direction between two of the spokes. The configuration described enables the production of a particularly weight-saving and delicate motor vehicle rim.

A further development of the invention provides that the rim base is formed by vacuum die-casting with a wall thickness that is at most three times its final wall thickness. In particular, the rim base is formed during vacuum die casting with its final width, namely its final extension in the axial direction. There is preferably no forming, in particular no flow forming, of the rim base after vacuum die casting. However, provision can be made for the rim base to be machined after the vacuum die casting in order to ensure the necessary surface quality of the rim base for the motor vehicle rim. Here, a reduction in wall thickness may take place.

At least the rim base is therefore formed during vacuum die casting with a wall thickness which is at most three times or at most twice the final wall thickness of the motor vehicle rim. For example, in order to achieve the final wall thickness, machining is carried out on one side or on two sides. However, it can also be provided that the wall thickness obtained during vacuum die casting is at most 50%, at most 25%, at most 15% or at most 10% greater than the final wall thickness of the motor vehicle rim when used as part of the motor vehicle wheel. In vacuum die casting, the rim base is thus produced with significantly reduced post-processing or it may even be produced without post-processing or at least almost post-processing-free. In any case, the reshaping of the rim base that was necessary up to now is no longer necessary, so that the motor vehicle rim can be manufactured extremely cost-effectively.

A further development of the invention provides that during the vacuum die casting an annular groove is formed in the motor vehicle rim and/or a hump is formed in the rim base. The annular groove is to be considered as an annular recess which is present in the motor vehicle rim after vacuum die casting. The annular groove can be continuous in the circumferential direction or composed of several annular groove segments spaced apart from one another in the circumferential direction. In principle, each of the annular groove segments can have any shape, as long as the annular groove segments are ring-shaped or circular overall on the motor vehicle rim.

The annular groove is open on the motor vehicle rim in the radial direction, for example in the radial direction outwards or inwards, or in the axial direction. An annular groove, which is continuous in the circumferential direction and which opens outwards in the radial direction after is used, for example, to accommodate a tire edge of a tire of the wheel of the motor vehicle. In this case, the annular groove is preferably delimited by the hump in the axial direction. Both the annular groove and the hump are produced during vacuum die casting, i.e. they are not subsequently formed on or in the rim base. In particular, they are not produced by machining the rim base.

Additionally or alternatively, it can be provided that the annular groove is formed on a side of the inner horn facing away from the outer horn. In this case, the annular groove is open in the axial direction, namely in the direction away from the outer horn. A reduction in the wall thickness of the inner horn is achieved by the annular groove, so that the inner horn preferably has the smaller wall thickness, particularly in the region of the annular groove. In this case, the annular groove serves to save material or to reduce the weight of the motor vehicle rim. In any case, the annular groove can be continuous in the circumferential direction. As an alternative, however, as already explained, an annular groove composed of several annular groove segments spaced apart from one another in the circumferential direction may be provided. The annular groove segments are formed by indentations of basically any design.

A development of the invention provides that the motor vehicle rim is made of AlSi10MnMgZn. This aluminum alloy is used as a casting material. The aluminum alloy has excellent strength properties for motor vehicle rims. For example, an AlSi alloy is used as the casting material, which contains the following components: 6.5% by weight to 12.0% by weight of Si, a maximum of 0.8% by weight of Mn, 0.25% by weight up to 0.6% by weight of Mg, 0.08% by weight to 0.5% by weight of Zn, a maximum of 0.3% by weight of Zr, a maximum of 0.025% by weight of Sr, a maximum of 0.5% by weight of impurities and the remainder Al. The alloy may have at least one of the following optional alloy components: a maximum of 0.2% by weight of V, a maximum of 0.2% by weight of Mo, a maximum of 0.3% by weight of Sn, a maximum of 0.3% by weight of Co and a maximum of 0.2% by weight of Ti.

Such an alloy is particularly suitable for the manufacture of motor vehicle wheel rims because it enables the realization of particularly delicate structures. The proportion of Mn is preferably greater than 0% by weight, for example, it is 0.2% by weight or 0.3% by weight on the one hand and up to 0.8% by weight on the other hand. The proportion of Mg is, for example, at most 0.5% by weight. The proportion of Zn is preferably at most 0.35% by weight. The proportion of Sr is more preferably greater than 0% by weight, in particular it is 0.006% by weight to 0.025% by weight. Particularly preferably the aluminum alloy contains Cr, namely a maximum of 0.3% by weight. Impurities are understood to mean at least one element of the periodic table that is present in the alloy without being intentionally added. Of course, the impurities can also contain several of these elements.

A development of the invention provides that the motor vehicle rim is heat-treated after vacuum die casting. The heat treatment consists, for example, of annealing the wheel rim. The annealing includes at least the heating of the motor vehicle rim to a certain temperature, which can also be referred to as the holding temperature, holding the motor vehicle rim at the holding temperature and subsequent cooling from the holding temperature, in particular down to a maximum temperature of 200° C. or down to ambient temperature.

It can be provided that the heat treatment is carried out for the entire motor vehicle rim. However, it can also be carried out locally, so that heat is introduced into the motor vehicle rim only locally and at the heat-treated location a higher temperature occurs than at other locations on the motor vehicle rim which are not subject to heat treatment.

Additionally or alternatively, the heat treatment can vary locally. This means that a first region of the motor vehicle rim undergoes a first heat treatment and a second region of the motor vehicle undergoes a second heat treatment, which is different from the first heat treatment, wherein a first holding temperature is used for the first heat treatment and a second holding temperature different from the first holding temperature is used for the second heat treatment.

A development of the invention provides that the heat treatment takes place at a global first temperature and the motor vehicle rim is only partially exposed to a higher second temperature. In other words, the heat treatment occurs in a locally different manner, namely basically at the first temperature and only in a locally limited way at the second temperature. The second temperature is used here, for example, for regions of the motor vehicle rim having a wall thickness which is greater than the small wall thickness. The first temperature, however, can be selected in such a way that optimal hardening takes place in those regions, in which the motor vehicle rim has the small wall thickness. This allows particularly good material properties in the motor vehicle wheel rim.

A development of the invention provides that the higher second temperature is applied by irradiation with electromagnetic radiation, in particular by infrared light irradiation, or by inductive or convective heating. In any case, the higher second temperature is only present locally on the motor vehicle rim, so that the irradiation with the electromagnetic radiation or the conductive or convective heating is only carried out locally.

A further development of the invention provides that the casting mold used in vacuum die casting is part of a die-casting mold, in particular a two-plate die-casting tool or a three-plate die-casting tool, and the casting material is injected into the casting mold through at least one injection opening, in particular through several injection openings. The three-plate die casting tool is characterized in that its gating system is on a different level than the injection opening. The three-plate die has three plates, namely a first plate, a second plate and a third plate. There is preferably at least one sprue channel between the first plate and the second plate, through which the injection opening is fluidically connected with an inlet opening.

The casting material is supplied to the casting mold through the inlet opening. The motor vehicle rim however is formed between the second plate and the third plate. This means that the second plate and the third plate form the actual casting mold. The at least one sprue channel and the motor vehicle rim to be manufactured are on opposite sides of the second plate. The casting material is preferably introduced into the casting mold through a plurality of injection openings. The multiple injection openings are preferably fluidically connected to the inlet port via the sprue channel or multiple sprue channels. The use of the two-plate die-casting tool or the three-plate die-casting tool enables the motor vehicle wheel rim to be manufactured particularly easily and quickly.

The invention also relates to a motor vehicle rim made of aluminum or an aluminum alloy for a motor vehicle wheel, produced in particular in accordance with the statements made within the scope of this description, wherein the motor vehicle rim has a rim base delimited on opposite sides by an outer horn and an inner horn, a hub with a central recess and a hole circle and a rim center connecting the rim base and the hub to one another and acting eccentrically on the rim base in longitudinal section. It is provided that the motor vehicle rim is produced in one piece and continuously in a casting mold by vacuum die casting of a casting material, wherein the motor vehicle rim has a small wall thickness of at most 15 mm at least in some regions and/or a curvature with a small radius of curvature of at most 4 mm, in particular of at most 2.5 mm or at most 2 mm, and/or a demolding surface running in the axial direction and in the radial direction and/or in the axial direction and in the tangential direction with respect to the longitudinal central axis of the motor vehicle rim, which surface completely lies in an imaginary plane, wherein the plane encloses an angle of at least 0° and at most 4° with the longitudinal central axis.

The advantages of such a configuration of the motor vehicle rims or of such a procedure in their manufacture have already been pointed out above. Both the motor vehicle rim and the method for producing it can be further developed in accordance with the explanations within the scope of this description, so that reference is made to them in this respect.

BRIEF DESCRIPTION OF THE FIGURES

The invention is explained in more detail below with reference to the exemplary embodiments illustrated in the drawing, without the invention being restricted. In particular.

DETAILED DESCRIPTION

Figure 1:
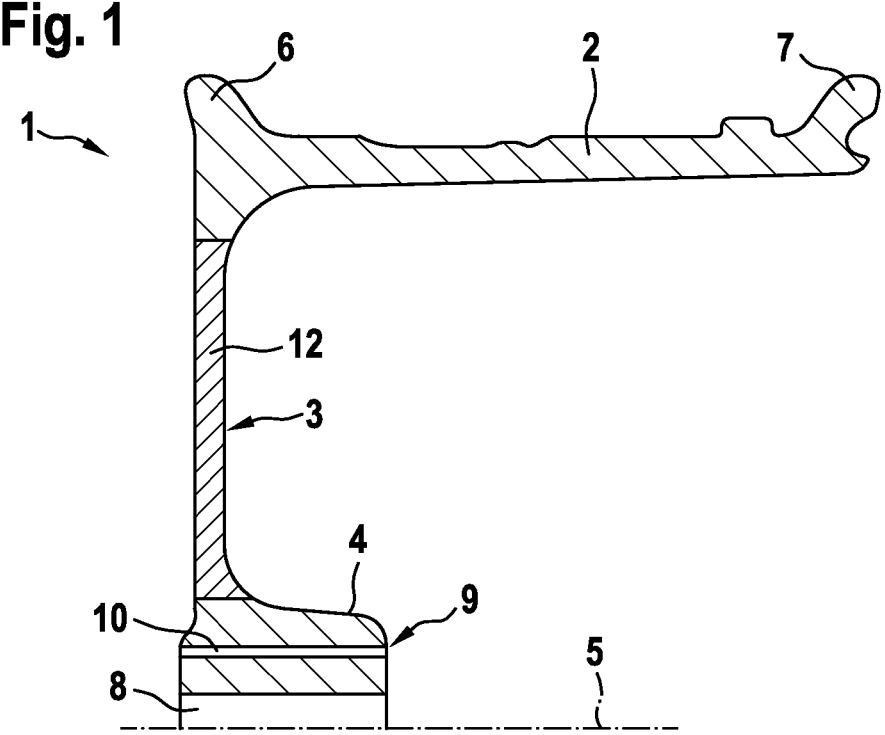
FIG. 1 shows a schematic longitudinal section through a motor vehicle rim along a longitudinal central axis of the motor vehicle rim.

FIG. 1 shows a schematic longitudinal section through a motor vehicle rim 1 for a wheel of a motor vehicle. The motor vehicle rim 1 has, as essential components, a rim base 2, a rim center 3 and a hub 4. The motor vehicle rim 1 is shown in a longitudinal section with respect to a longitudinal central axis 5 of the motor vehicle rim 1. The rim base 2 is limited in the axial direction on the one hand by an outer horn 6 and on the other hand by an inner horn 7, which, starting from the rim base 2, extend outwards in the radial direction with respect to the longitudinal central axis 5. Furthermore it should be noted that the axial extent of the rim base 2 extends to a respective outside end of the outer horn 6 or the inner horn 7. The axial extension of the rim base 2 thus includes the axial extensions of the outer horn 6 and the inner horn 7.

The rim base 2 and the hub 4 are connected to one another via the rim center 3. The rim center 3 thus engages both the rim base 2 and the hub 4 and extends, starting from the hub 4 to the rim base 2. The hub 4 has a central recess 8 which, with respect to the longitudinal central axis 5, is disposed centrally in the hub 4 and completely penetrates it in the axial direction. In addition, the hub 4 has a hole circle 9 with a plurality of bores 10, each of which serves to receive a fastener by means of which the motor vehicle rim 1 can be fastened or is fastened to a wheel hub of the motor vehicle.

In the exemplary embodiment shown here, the rim center 3 has a plurality of spokes 11 (not shown) which are arranged spaced apart from one another in the circumferential direction. Each of the spokes 11 extends, starting from the hub 4 up to the rim base 2. In the circumferential direction between the spokes 11 there is an intermediate spoke region, which is delimited in the circumferential direction by the spokes 11, in the radial direction inwards by the hub 4 and in the radial direction outwards by the rim base 2.

In the illustrated embodiment, an intermediate spoke element 12 is formed in this intermediate spoke region, which element completely fills the intermediate spoke region, for example. At least the intermediate spoke element 12 has a small wall thickness of at most 15 mm, at most 10 mm, at most 7.5 mm or at most 5 mm. In order to realize this, the motor vehicle rim 1 is produced in one piece and continuously in a casting mold by vacuum die casting of a casting material. Aluminum or an aluminum alloy is used as the casting material.

Figure 2:
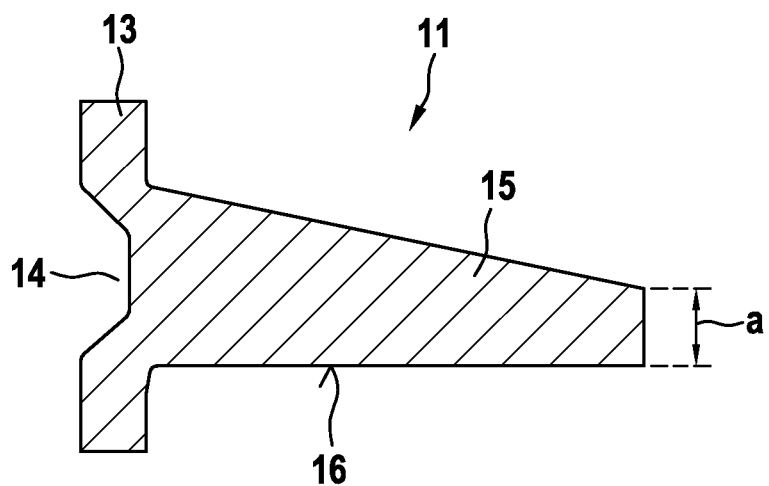
FIG. 2 shows a section through a spoke of a rim center of the motor vehicle rim in a first exemplary embodiment.

FIG. 2 shows one of the spokes 11 in a schematic cross-sectional view along a longitudinal central axis of the spoke 11. The longitudinal central axis here extends from the rim base 2 to the hub 4. It preferably intersects the longitudinal central axis 5 of the motor vehicle rim 1, in particular at right angles thereto. The spoke 11 consists, viewed in cross section, of an essentially rectangular front cover 13, in which a radial groove 14 is embossed on one side. On the other side, a support element 15 extends from the front cover 13 and tapers, starting from the front cover 13, again viewed in cross section. The front cover 13 is disposed, as seen in the axial direction with respect to the longitudinal central axis 5 on the side of the support element 15 facing the inner horn 7. The support element 15 is positioned correspondingly on the side of the front cover 13 facing the outer horn 6.

The radial groove 14 is preferably designed to be continuous in the radial direction, it thus extends from the hub 4 to the rim base 2. The radial groove 14 can, however, also be designed to be discontinuous. The radial groove 14 is formed on an inner side of the motor vehicle rim 1 and is therefore not readily visible after the motor vehicle rim 1 has been mounted on the motor vehicle. The support element 15 has a wall thickness a on its side facing away from the front cover 13, which corresponds to the small wall thickness. The wall thickness a is therefore at most 15 mm, but is preferably less than 15 mm. On the support element 15 there is formed a demolding surface 16, which lies entirely in an imaginary plane. In the exemplary embodiment shown, the demolding surface 16 extends in the axial direction from the front cover 13 to the end of the support element 15 facing away from the front cover 13.

The demolding surface 16 extends both in the axial direction and in the radial direction, but not necessarily in the circumferential direction, in each case with respect to the longitudinal central axis 5 of the motor vehicle rim 1. The imaginary plane in which the demolding surface 16 lies encloses an angle of more than 0° and at most at least 4° with the longitudinal central axis 5 of the motor vehicle rim 1 or an axis parallel thereto. In the exemplary embodiment shown here, the demolding surface 16 extends at an angle of 1.5° to the longitudinal central axis 5, so that the demolding surface 16 is demolded almost parallel thereto.

Figure 3:
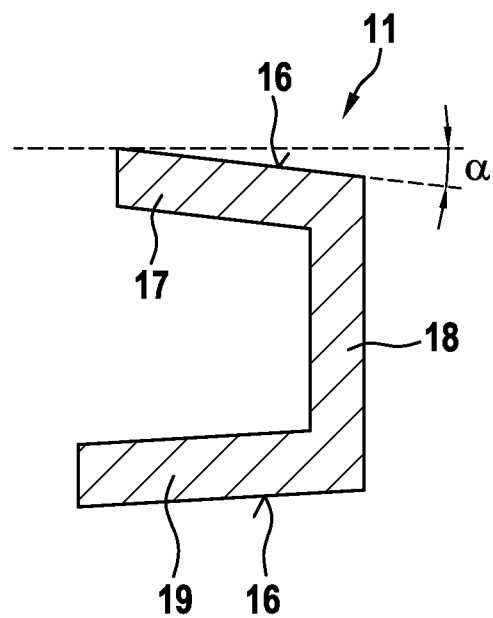
FIG. 3 shows a schematic section through a spoke in a second exemplary embodiment.

FIG. 3 shows the spoke 11 in a second embodiment, which can be used instead of the first embodiment for the motor vehicle rim 1. In the second embodiment, the spoke 11 consists of three webs 17, 18 and 19 which are arranged essentially in a U-shape relative to one another. This means that the webs 17 and 19 are connected to each other only through the web 18, which engages the ends of the webs 17 and 19 respectively. The webs 17 and 19 extend from the web 18 in the same axial direction. A demolding surface 16 is positioned both on the web 17 and the web 19, respectively. The demolding surfaces 16 or the planes that completely accommodate them each enclose an angle $\alpha$ with the longitudinal central axis, where $\alpha$ is again greater than 0° and is at most 4°. In the exemplary embodiment illustrated here, the angle $\alpha$ is greater than 0°, for example it is approximately or exactly equal to 3°.

The described configuration of the motor vehicle rim 1 achieves an extremely filigree appearance and at the same time ensures cost-effective and rapid production of the motor vehicle rim 1 due to the production of the motor vehicle rim 1 by vacuum pressure casting. In addition, by vacuum die casting of the aluminum or aluminum alloy excellent strength values are achieved.

REFERENCE LIST 1 motor vehicle rim
2 rim base
3 rim center
4 hub
5 longitudinal central axis
6 outer horn
7 inner horn
8 central recess
9 hole circle
10 bore
11 spoke
12 intermediate spoke element
13 front cover
14 radial groove
15 support element
16 demolding surface
17 web
18 web
19 web

The invention claimed is:

1. A method for manufacturing a motor vehicle rim made of aluminum or an aluminum alloy for a motor vehicle wheel, comprising:
vacuum die casting a casting material in a casting mold; and
forming the motor vehicle rim in the casting mold continuously and in one piece;
wherein the motor vehicle rim, as formed in the casting mold, has a rim base delimited on opposite sides by an outer horn and an inner horn, a hub with a central recess and a hole circle as well as a rim center connecting the rim base and the hub to one another and acting eccentrically on the rim base in a longitudinal section, wherein the motor vehicle rim has at least one of:
a smallest wall thickness greater than 0 mm and of at most 15 mm at least in some regions,
a curvature with a smallest radius of curvature greater than 0 mm and of at most 4 mm, and
a demolding surface running in one or both of: an axial direction and in a radial direction, and in the axial direction and in a tangential direction, with respect to a longitudinal central axis of the motor vehicle rim, which surface completely lies in an imaginary plane, wherein the plane encloses an angle greater than 0° and of at most 4° with the longitudinal central axis.

2. The method of claim 1, the method further comprising forming the rim center with a plurality of spokes, which are spaced apart from one another in a circumferential direction with respect to the longitudinal central axis of the motor vehicle rim.

3. The method of claim 2, the method further comprising manufacturing the motor vehicle rim, in regions, with a first wall thickness greater than 15 mm and in regions with a second thickness corresponding to the smallest thickness.

4. The method of claim 2, wherein the smallest thickness is used in a region positioned between two spokes in a circumferential direction, so that the two spokes are connected to one another by an intermediate spoke element manufactured during the vacuum die casting, which element has the smallest thickness, at least in regions.

5. The method of claim 2, wherein the rim base is manufactured during the vacuum die casting with the smallest thickness and/or with the demolding surface on its radially inner side.

6. The method of claim 2, wherein, during the vacuum die casting, an annular groove is formed in the motor vehicle rim and/or a hump is formed in the rim base.

7. The method of claim 1, the method further comprising manufacturing the motor vehicle rim, in regions, with a first wall thickness greater than 15 mm and in regions with a second thickness corresponding to the smallest thickness.

8. The method of claim 7, wherein the smallest thickness is used in a region positioned between two spokes in a circumferential direction, so that the two spokes are connected to one another by an intermediate spoke element manufactured during the vacuum die casting, which element has the smallest thickness, at least in regions.

9. The method of claim 7, wherein the rim base is manufactured during the vacuum die casting with the smallest thickness and/or with the demolding surface on its radially inner side.

10. The method of claim 7, wherein, during the vacuum die casting, an annular groove is formed in the motor vehicle rim and/or a hump is formed in the rim base.

11. The method of claim 1, wherein the smallest thickness is used in a region positioned between two spokes in a circumferential direction, so that the two spokes are connected to one another by an intermediate spoke element manufactured during the vacuum die casting, which element has the smallest thickness, at least in regions.

12. The method of claim 11, wherein the rim base is manufactured during the vacuum die casting with the smallest thickness and/or with the demolding surface on its radially inner side.

13. The method of claim 11, wherein, during the vacuum die casting, an annular groove is formed in the motor vehicle rim and/or a hump is formed in the rim base.

14. The method of claim 1, wherein the rim base is manufactured during the vacuum die casting with the smallest thickness and/or with the demolding surface on its radially inner side.

15. The method of claim 14, wherein, during the vacuum die casting, an annular groove is formed in the motor vehicle rim and/or a hump is formed in the rim base.

16. The method of claim 1, wherein, during the vacuum die casting, an annular groove is formed in the motor vehicle rim and/or a hump is formed in the rim base.

17. The method of claim 1, wherein the motor vehicle rim is made of AlSi10MnMgZn.

18. The method of claim 1, wherein the motor vehicle rim is heat treated after the vacuum die casting.

19. The method of claim 1, wherein the casting mold used in the vacuum die casting is part of a pressure die tool and the casting material is injected into the casting mold through at least one injection opening.

20. A motor vehicle rim made of aluminum or an aluminum alloy for a wheel of a motor vehicle, wherein the motor vehicle rim has a rim base delimited on opposite sides by an outer horn and an inner horn, a hub with a central recess and a hole circle as well as a rim center connecting the rim base and the hub to one another and acting eccentrically on the rim base in a longitudinal section, wherein the motor vehicle rim is manufactured in one piece and continuously in a casting mold by vacuum die casting of a casting material, wherein the motor vehicle rim has at least one of:
a smallest wall thickness greater than 0 mm and of at most 15 mm at least in some regions, a curvature with a smallest radius of curvature greater than 0 mm and of at most 4 mm, and a demolding surface running in one or both of: an axial direction and in a radial direction, and in the axial direction and in a tangential direction, with respect to a longitudinal central axis of the motor vehicle rim, which surface completely lies in an imaginary plane, wherein the plane encloses an angle greater than 0° and of at most 4° with the longitudinal central axis.

\* \* \* \* \*